US008736491B2

(12) United States Patent
Morioka et al.

(10) Patent No.: US 8,736,491 B2
(45) Date of Patent: May 27, 2014

(54) COMMUNICATION APPARATUS AND COMMUNICATION METHOD, COMPUTER PROGRAM, AND COMMUNICATION SYSTEM

(75) Inventors: Yuichi Morioka, Tokyo (JP); Takushi Kunihiro, Tokyo (JP); Kazuyuki Sakoda, Tokyo (JP); Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 13/203,974

(22) PCT Filed: Feb. 9, 2010

(86) PCT No.: PCT/JP2010/051897
§ 371 (c)(1),
(2), (4) Date: Aug. 30, 2011

(87) PCT Pub. No.: WO2010/101003
PCT Pub. Date: Sep. 10, 2010

(65) Prior Publication Data
US 2011/0316744 A1 Dec. 29, 2011

(30) Foreign Application Priority Data

Mar. 6, 2009 (JP) ................ P2009-054135

(51) Int. Cl.
*H04B 7/00* (2006.01)
(52) U.S. Cl.
USPC ........................................ 342/367
(58) Field of Classification Search
USPC .................. 342/147, 367, 368, 370; 455/561, 455/562.1; 370/465, 469
See application file for complete search history.

(56) References Cited

U.S. PATENT DOCUMENTS

2003/0048770 A1* 3/2003 Proctor, Jr. .................... 370/349
2008/0026797 A1* 1/2008 Nanda et al. ............... 455/562.1

* cited by examiner

*Primary Examiner* — Dao Phan
(74) *Attorney, Agent, or Firm* — Sony Corporation of America

(57) ABSTRACT

By effectively utilizing the beam pattern used at the time of the last communication, a directional link can be efficiently established, thereby reducing overhead.
When establishing a link, a communication apparatus 100 transmits a preparation frame by using the last used transmit beam pattern, thereby efficiently establishing a directional link and reducing overhead. Also, when establishing a link, the communication apparatus 100 uses the last used receive beam pattern to receive a preparation frame whose transmission timing is known, thereby efficiently establishing a directional link and reducing overhead.

12 Claims, 14 Drawing Sheets

COMMUNICATION APPARATUS AND COMMUNICATION METHOD, COMPUTER PROGRAM, AND COMMUNICATION SYSTEM

TECHNICAL FIELD

The present invention relates to a communication apparatus and a communication method, a computer program, and a communication system which perform radio communication by using millimeter waves, for example, in particular, a communication apparatus and a communication method, a computer program, and a communication system which extend the signal reaching distance of millimeter waves by directing the beam of a directional antenna in the direction in which the communicating party is positioned.

BACKGROUND ART

Radio communication called "millimeter wave" can realize higher communication speed by use of high frequency electromagnetic waves. The main uses of millimeter-wave communication include short distance radio access communications, image transmission systems, simplicity radios, and automotive anti-collision radars. Also, at present, technological developments on millimeter-wave communication aimed at promoting its usage are underway, such as realization of large-capacity/long-distance transmission, downsizing of radio apparatus, and reduced cost. Here, the wavelength of millimeter waves is 10 mm to 1 mm, which corresponds to 30 GHz to 300 GHz in terms of frequency. For example, in the case of radio communication using the 60-GHz band, since channels can be allocated in GHz units, very high speed data communication can be performed.

Even compared with microwaves which are in widespread use in the wireless LAN (Local Area Network) technology or the like, millimeter waves are short in wavelength and exhibit high rectilinearity, and can transmit a very large amount of information. On the other hand, since millimeter waves are prone to severe attenuation due to reflection, the radio paths over which to perform communication are mainly direct waves, or reflected waves that are reflected once at most. Also, millimeter waves have such property that the radio signal does not reach far due to large propagation loss.

To compensate for this flight distance problem of millimeter waves, one conceivable method is to impart the antennas of a transmitter and a receiver with directivity, and direct their transmit beam and receive beam in the direction in which the communicating party is positioned to thereby extend the signal reaching distance. The beam directivity can be controlled by, for example, providing each of the transmitter and receiver with a plurality of antennas, and varying the transmit weight or receive weight for each of the antennas. Since reflected waves are rarely used and direct waves become important for millimeter waves, a beam-shaped directivity is suitable, and it is conceivable to use a sharp beam as the directivity. More preferably, radio signals are transmitted and received while directing each of the transmit beam and receive beam toward the communicating party.

For example, there has been proposed a radio transmission system in which, after the direction of the transmit antenna is determined by transmitting a signal for determining the direction of directivity of the transmit antenna by a second communication means using communication based on one of power line communication, optical communication, and acoustic communication, radio communication between the transmitter and the receiver is performed by a first communication means using radio waves of 10 GHz or more (see, for example, PTL 1).

Also, a method of extending the signal reaching distance by using the directivity of an antenna is also applied to IEEE802.15.3c, which is the standard specification of wireless PAN (mmWPAN: millimeter-wave Wireless Personal Area Network) using the millimeter-wave band.

As a technique for training of the optimal directivity of an antenna, a common method is to send a training signal from the transmitting end, and determine an optimal directivity at the receiving end in accordance with the result of its reception. For example, it is possible to vary the directivity of the antenna at the transmitting end at every transmission/reception of a single frame, and determine an optimal directivity at the receiving end in accordance with the results of frame reception.

In the case of uses in mobile environments with many moving objects, even if a directional link between communication stations is once established, there is a possibility that the directional link becomes invalid due to the subsequent movement of the communication stations or the presence of obstacles. That is, in mobile environments, it is difficult to use directional millimeter-wave communication. For this reason, one conceivable mode of operation is such that directional frames are not used when re-establishing a link, and transmission of directional frames is started after a directivity training process is conducted by using omni-directional frames. For example, in the case of adopting a collision avoidance procedure utilizing RTS/CTS handshake in millimeter-wave communication, preparation frames such as an RTS frame and a CTS frame are transmitted and received omni-directionally without using directivity, and after the direction of directivity is determined on the basis of the condition of their reception, data frames are then transmitted and received by using the directivity.

However, if a training process for an optimal directivity is executed anew every time a link is re-established, this introduces overhead until transmission of data frames is started. Also, if directivity is not used in millimeter-wave communication, this can possibly lead to a situation where due to the resulting short signal reaching distance, preparation frames such as an RTS frame and a CTS frame do not reach the communicating party (or cannot be received by the communicating party) and, as a result, transmission of data frames is never started (or directional communication cannot be started).

CITATION LIST

Patent Literature

PTL 1: Japanese Patent No. 3544891

SUMMARY OF INVENTION

Technical Problem

An object of the present invention resides in providing superior communication apparatus and communication method, computer program, and communication system, which can extend the signal reaching distance of millimeter waves by directing the beam of a directional antenna in the direction in which the communicating party is positioned.

A further object of the present invention resides in providing superior communication apparatus and communication method, computer program, and communication system, which can reduce overhead by efficiently establishing a directional link.

Solution to Problem

The present application has been made in view of the above-mentioned problems, and the invention as defined in Claim 1 is a communication apparatus including:

a radio communication section that can perform directional radio communication in accordance with a communication mode using a predetermined high frequency band, in which the communication apparatus performs directional communication of a predetermined preparation frame by controlling a directivity of the radio communication section, when starting data transmission after exchanging the preparation frame with a communicating party.

Also, according to an embodiment of the present application, the communication apparatus is configured to perform the directional communication of the preparation frame by using a communication beam pattern used when last performing frame exchange with the communicating party.

Also, according to an embodiment of the present application, the communication apparatus is configured to adjust the communication beam pattern in accordance with an elapsed time from when last performing frame exchange with the communicating party.

Also, according to an embodiment of the present application, the communication apparatus is configured such that when the communication beam pattern used when last performing frame exchange with the communicating party is not retained, the communication apparatus performs communication of the preparation frame by using an omni-directional communication beam pattern, or performs communication of the preparation frame by using a communication beam pattern obtained by executing a training operation with the communicating party.

Also, according to en embodiment of the present application, the communication apparatus is configured such that: a procedure is applied in which a data transmitting end starts a transmission process of a data frame after transmitting a transmission start request frame and receiving a confirmation frame replied from a data receiving end; and when operating as the data transmitting end, the communication apparatus transmits the transmission start request frame by using a transmit beam pattern directed in a direction of a position of the data receiving end.

Also, according to an embodiment of the present application, the communication apparatus is configured such that when the communication apparatus is unable to receive the confirmation frame from the data receiving end in response to transmission of the transmission start request frame using the transmit beam pattern directed in the direction of the position of the data receiving end, the communication apparatus retransmits the transmission start request frame by using an omni-directional transmit beam pattern.

Also, according to an embodiment of the present application, the communication apparatus is configured to wait for a reception of a frame whose transmission timing from the communicating party is known, by using a receive beam pattern directed in a direction of a position of the communicating party.

Also, according to an embodiment of the present application, the communication apparatus is configured to notify information related to a transmission segment allocated to the communicating party, and within the transmission segment, wait for a reception by using a receive beam pattern directed in a direction of a position of the communicating party.

Also, according to an embodiment of the present application, the communication apparatus is configured such that: a procedure is applied in which a data transmitting end transmits a transmission start request frame, a data receiving end replies a confirmation frame after elapse of a first predetermined period from reception of the transmission start request frame, the data transmitting end starts transmission of a data frame after elapse of a second predetermined period from reception of the confirmation frame, and the data receiving end replies an acknowledgement frame after elapse of a third predetermined period from reception of the data frame; and when operating as the data transmitting end, the communication apparatus waits for a reception of the confirmation frame by using a receive beam pattern directed in a direction of a position of the data receiving end, after elapse of the first predetermined period from transmission of the transmission start request frame, or the communication apparatus waits for a reception of the confirmation frame by using a receive beam pattern directed in a direction of a position of the data receiving end, after elapse of the third predetermined period from transmission of the data frame.

Also, according to an embodiment of the present application, the communication apparatus is configured such that: a procedure is applied in which a data transmitting end transmits a transmission start request frame, a data receiving end replies a confirmation frame after elapse of a first predetermined period from reception of the transmission start request frame, the data transmitting end starts transmission of a data frame after elapse of a second predetermined period from reception of the confirmation frame, and the data receiving end replies an acknowledgement frame after elapse of a third predetermined period from reception of the data frame; and when operating as the data receiving end, the communication apparatus waits for a reception of the data frame by using a receive beam pattern directed in a direction of a position of the receiving end, after elapse of the second predetermined period from transmission of the confirmation frame.

Also, an embodiment of the present application is a communication method for a communication apparatus including a radio communication section that can perform directional radio communication in accordance with a communication mode using a predetermined high frequency band, including the step of:

performing directional communication of a predetermined preparation frame by controlling a directivity of the radio communication section, when starting data transmission after exchanging the preparation frame with a communicating party.

Also, an embodiment of the present application is a computer program which is described in a computer-readable format so as to execute, on a computer, communication processing for a communication apparatus including a radio communication section that can perform directional radio communication in accordance with a communication mode using a predetermined high frequency band, the computer causing the computer to function as:

means for performing directional communication of a predetermined preparation frame by controlling a directivity of the radio communication section, when starting data transmission after exchanging the preparation frame with a communicating party.

The computer program according to an embodiment of the present application defines a computer program that is described in a computer-readable format so as to implement predetermined processing on a computer. In other words, by installing the computer program according to the present application to the computer, synergistic operation is exerted on the computer, making it possible to obtain the same operational effect as that of the communication apparatus according to Claim 1 of the present application.

Also, an embodiment of the present application is a communication system to which a procedure that starts data transmission after exchanging a predetermined preparation frame with a communicating party is applied, including a first communication apparatus that transmits the preparation frame while performing directivity control, and a second communication apparatus that receives the transmitted preparation frame.

Also, an embodiment of the present application is a communication system to which a procedure that starts data transmission after exchanging a predetermined preparation frame with a communicating party is applied, including a first communication apparatus that transmits the preparation frame at a predetermined transmission timing, and a second communication apparatus that receives the preparation frame at the transmit timing by using a receive beam pattern directed in a direction of a position of the first communication apparatus.

It should be noted, however, that the term "system" as used herein refers to a logical aggregation of a plurality of devices (or functional modules that implement specific functions), and it does not particularly matter whether or not the individual devices or functional modules exist within the same casing.

Advantageous Effects of Invention

According to the present invention, it is possible to provide superior communication apparatus and communication method, computer program, and communication system, which can extend the signal reaching distance of millimeter waves by directing the beam of a directional antenna in the direction of the position of the communicating party.

Also, according to the present invention, it is possible to provide superior communication apparatus and communication method, computer program, and communication system, which can reduce overhead by efficiently establishing a directional link.

According to an embodiment of the present application, when starting data transmission after exchanging a predetermined preparation frame with the communicating party, the preparation frame is transmitted/received by using a beam pattern having directivity. Thus, it is possible to reduce overhead when establishing a link.

Also, according to an embodiment of the present application, the communication apparatus performs directional communication of the preparation frame by using a communication beam pattern used when last performing frame exchange with the communicating party. Thus, it is possible to reduce overhead when establishing a link.

Also, according to an embodiment of the present application, the communication apparatus adjusts the communication beam pattern used when last performing frame exchange with the communicating party, in accordance with the elapsed time before using the communication beam pattern. Thus, it is possible to perform communication of the preparation frame even if the communicating party has moved with the elapsed time.

Also, according to an embodiment of the present application, even when the communication beam pattern used when last performing frame exchange with the communicating party is not retained, the communication apparatus can perform communication of the preparation frame by using an omni-directional communication beam pattern, or by using a communication beam pattern obtained by executing a training operation with the communicating party.

Also, according to an embodiment of the present application, in the case of using RTS/CTS handshake, the communication apparatus transmits an RTS frame by using a transmit beam pattern directed in the direction of the position of the communicating party. Thus, it is possible to reduce overhead when establishing a link.

Also, according to an embodiment of the present application, when the communication apparatus is unable to receive a CTS frame even after transmitting an RTS frame by using a transmit beam pattern directed in the direction of the position of the communicating party, the communication apparatus retransmits the RTS frame by using an omni-directional transmit beam pattern. Thus, the probability of the RTS frame reaching the communicating party becomes higher even if the communicating party has moved with the elapsed time.

Also, according to an embodiment of the present application, the communication apparatus waits for a reception of a frame whose transmission timing is known, by using a receive beam pattern directed in the direction of the position of the communicating party. Thus, it is possible to reduce overhead when establishing a link.

Also, according to an embodiment of the present application, within the transmission segment allocated to the communicating party by the communication apparatus, the communication apparatus waits for a reception by using a receive beam pattern directed in the direction of the position of the communicating party. Thus, it is possible to reduce overhead when establishing a link.

Also, according to an embodiment of the present application, in the case of using RTS/CTS handshake, after the elapse of a predetermined period from transmission of an RTS frame, the communication apparatus waits for a reception of a CTS frame by using a receive beam pattern directed in the direction of the position of the data receiving end, and further, after the elapse of a predetermined period from transmission of a data frame, the communication apparatus waits for a reception of an ACK frame by using a receive beam pattern directed in the direction of the position of the data receiving end. Thus, it is possible to reduce overhead when establishing a link.

Also, according to an embodiment of the present application, in the case of using RTS/CTS handshake, after the elapse of a predetermined period from transmission of a CTS frame, the communication apparatus waits for a reception of a data frame by using a receive beam pattern directed in the direction of the position of the data transmitting end. Thus, it is possible to reduce overhead when establishing a link.

Other objects, features, and advantages of the present invention will become apparent from the following detailed description of embodiments of the present invention and the accompanying drawings.

DESCRIPTION OF EMBODIMENTS

Hereinbelow, embodiments of the present invention will be described in detail with reference to the drawings. It should be noted that while the 60-Ghz band used in the VHT (Very High Throughput) standard can be given as an example of millimeter-wave communication mode, the scope of the present invention is not limited to a specific frequency band.

Figure 1:
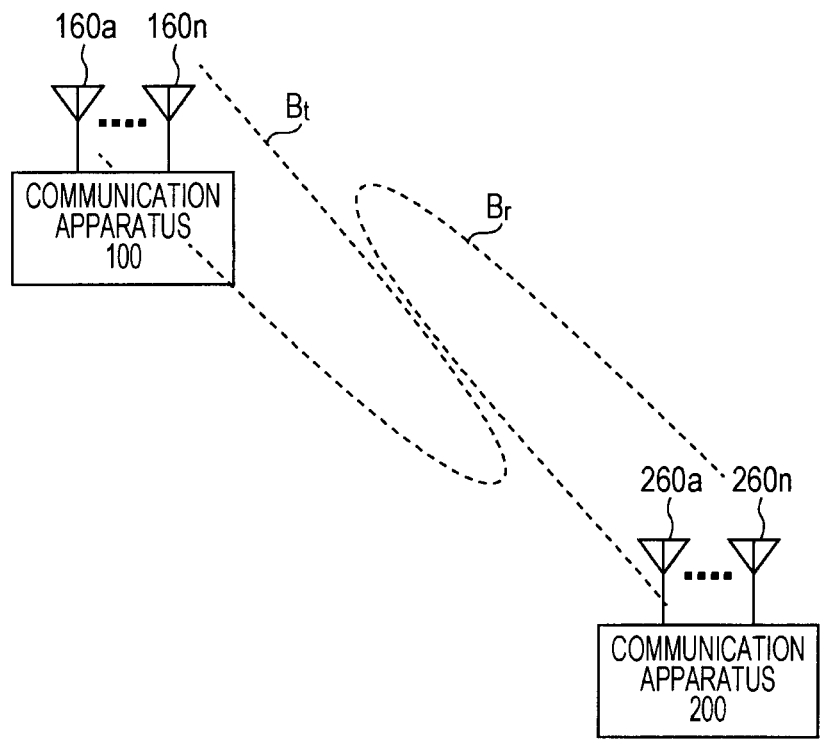
FIG. 1 is a diagram schematically showing an example of the configuration of a millimeter-wave radio communication system according to an embodiment of the present invention.

FIG. 1 schematically shows an example of the configuration of a millimeter-wave radio communication system according to an embodiment of the present invention. The radio communication system shown in the drawing includes a communication apparatus 100 and a communication apparatus 200.

The communication apparatuses 100 and 200 can perform radio communication with each other in accordance with the millimeter-wave communication mode. Since the millimeter-wave communication mode has high rectilinearity and suffers severe attenuation at reflection, it is more preferable that radio signals be transmitted and received while directing each of the transmit beam and receive beam toward the communicating party.

In the example shown in FIG. 1, the communication apparatus 100 includes a plurality of antennas 160a to 160n for transmitting and receiving radio signals in accordance with the millimeter-wave communication mode. Further, the directivity $B_t$ of the transmit beam is controlled by adjusting the weights of the respective signals transmitted via the antennas 160a to 160n. In the example shown in the drawing, the transmit beam $B_t$ is directed in the direction of the position of the communication apparatus 200 that serves as the communicating party.

Also, the communication apparatus 200 includes a plurality of antennas 260a to 260n for transmitting and receiving radio signals in accordance with the millimeter-wave communication mode. Further, the directivity $B_r$ of the receive beam is controlled by adjusting the weights of the respective signals received via the antennas 260a to 260n. In the example shown in the drawing, the receive beam $B_r$ is directed in the direction of the position of the communication apparatus 100 that serves as the communicating party.

Figure 2:
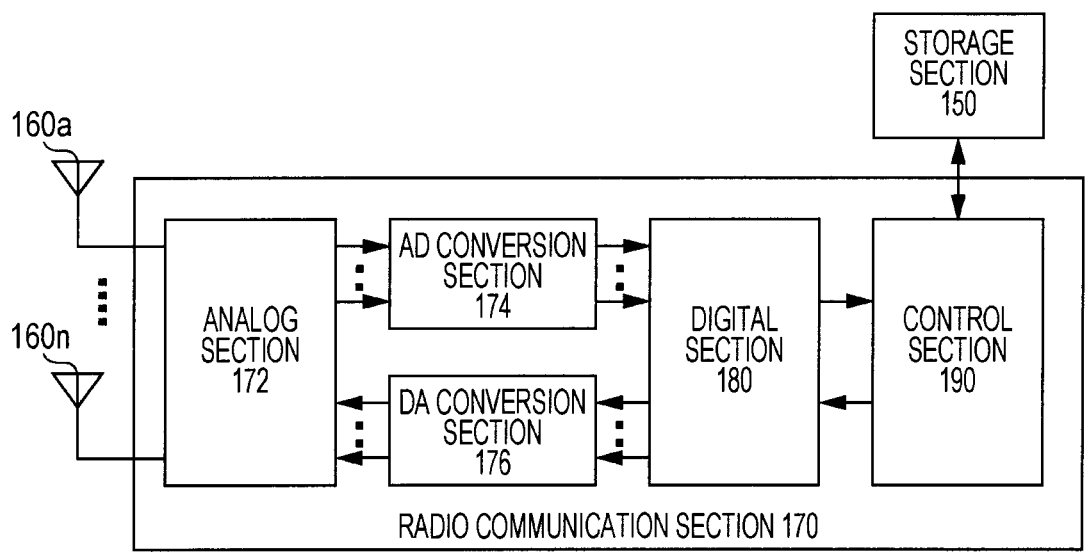
FIG. 2 is a diagram showing an example of the configuration of a communication apparatus 100.

FIG. 2 shows an example of the configuration of the communication apparatus 100. The communication apparatus 100 shown in the drawing may operate as a broadband router or a wireless access point. Although not shown, the communication apparatus 200 may be configured in the same manner.

The communication apparatus 100 includes a storage section 150, the plurality of antennas 160a to 160n, and a radio communication section 170. The radio communication section 170 includes an analog section 172, an AD conversion section 174, a DA conversion section 176, a digital section 180, and a control section 190.

The plurality of antennas 160a to 160n are used for radio communication according to the millimeter-wave communication mode. Specifically, the antennas 160a to 160n each transmit a radio signal weighted using a predetermined weighting coefficient, by using a millimeter wave. Also, the antennas 160a to 160n receive millimeter-wave radio signals, and output the radio signals to the analog section 172.

The analog section 172 typically corresponds to an RF circuit for transmitting and receiving radio signals according to the millimeter-wave communication mode. That is, the analog section 172 low-noise amplifies and down-converts a plurality of receive signals received by the respective antennas 160a to 160n, and outputs the resulting signals to the AD conversion section 174 in the subsequent stage. Also, the analog section 172 up-converts a plurality of transmit signals each converted into an analog signal by the DA conversion section 176, to the RF band, power-amplifies the resulting signals, and outputs the signals to the respective antennas 160a to 160n.

The AD conversion section 174 converts each of a plurality of analog receive signals inputted from the analog section 172 into a digital signal, and outputs the digital signal to the digital section 180 in the subsequent stage. Also, the DA conversion section 176 converts each of a plurality of digital transmit signals inputted from the digital section 180 into an analog signal, and outputs the analog signal to the analog section 172.

The digital section 180 is typically made up of a circuit for demodulating and decoding receive signals in accordance with the millimeter-wave communication mode, and a circuit for encoding and modulating transmit signals in accordance with the millimeter-wave communication mode.

Figure 3:
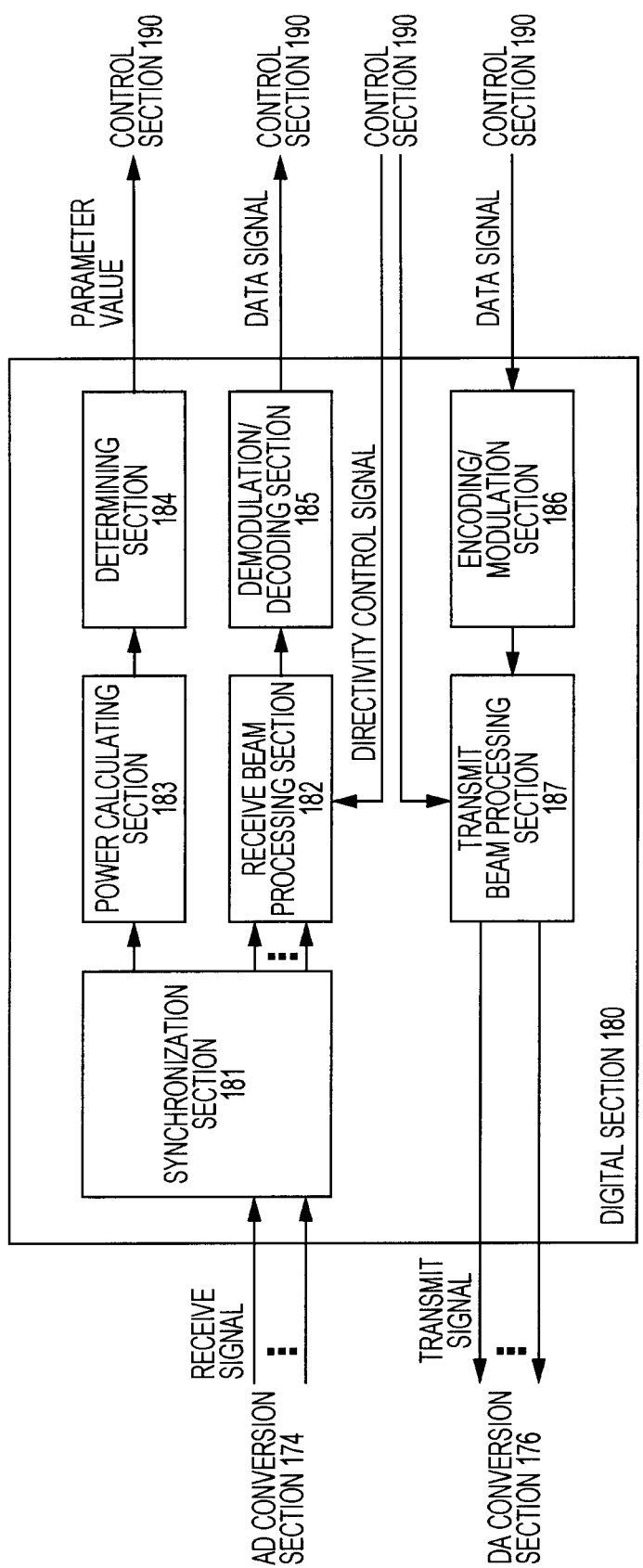
FIG. 3 is a diagram showing an example of the internal configuration of a digital section 180.

FIG. 3 shows an example of the internal configuration of the digital section 180. As shown in the drawing, the digital section 180 includes a synchronization section 181, a receive beam processing section 182, a power calculating section 183, a determining section 184, a demodulation/decoding section 185, an encoding/modulation section 186, and a transmit beam processing section 187.

The synchronization section 181 synchronizes the start timing of a receiving process in accordance with the preamble at the beginning of frames, for a plurality of receive signals received by the plurality of antennas 160*a* to 160*n*, and outputs the resulting signals to the receive beam processing section 182, for example.

The receive beam processing section 182 performs a weighting process in accordance with a uniform distribution or Taylor distribution, for example, for the plurality of receive signals inputted from the synchronization section 181, thereby controlling the directivity of the receive beam. Then, the receive beam processing section 182 outputs the weighted receive signals to the power calculating section 183 and the demodulation/decoding section 185.

When performing training of optimal transmit and receive beam directions, the power calculating section 183 calculates the received powers of receive signals transmitted and received in each of transmit and receive beam directions, and sequentially outputs the received powers to the determining section 184. Then, the determining section 184 determines an optimal transmit beam direction and an optimal receive beam direction on the basis of the received power values inputted from the power calculating section 183. Then, parameter values for identifying the determined beam directions are stored into the storage section 150 via the control section 190. Here, an optimal beam direction typically corresponds to a beam direction that maximizes the series of received power values inputted from the power calculating section 183 with respect to a single beam training signal.

The demodulation/decoding section 185 demodulates and decodes each receive signal weighted by the receive beam processing section 182, in accordance with arbitrary modulation mode and encoding mode used for the millimeter-wave communication mode, thereby acquiring a data signal. Then, the demodulation/decoding section 185 outputs the acquired data signal to the control section 190.

The encoding/modulation section 186 encodes and modulates a data signal inputted from the control section 190, in accordance with arbitrary encoding mode and modulation mode used for the millimeter-wave communication mode, thereby generating a transmit signal. Then, the encoding/modulation section 186 outputs the generated transmit signal to the transmit beam processing section 187.

The transmit beam processing section 187 generates a plurality of transmit signals weighted in accordance with a uniform distribution or Taylor distribution, for example, from the transmit signal inputted from the encoding/modulation section 186, and controls the directivity of the transmit beam. For example, the weight value to be used by the transmit beam processing section 187 is specified by a directivity control signal inputted from the control section 190. The plurality of transmit signals weighted by the transmit beam processing section 187 are each outputted to the DA conversion section 176.

Returning to FIG. 2, the description will continue on the configuration of the radio communication apparatus 100. The control section 190 is formed using, for example, an arithmetic unit such as a microprocessor, and controls the overall operation of the radio communication section 170. Also, the control section 170 acquires, from the storage section 150, a parameter value for identifying an optimal transmit beam direction or receive beam direction, and outputs, to the transmit beam processing section 187 within the digital section 180, a directivity control signal for instructing that a weighting coefficient be allocated to each of the antennas 160*a* to 160*n* so as to form the beam direction identified on the basis of the parameter value. In this way, an optimal beam pattern is formed such that the transmit beam or receive beam at the time of radio transmission according to the millimeter-wave communication mode by the radio communication apparatus 100 is directed in the direction in which the communicating party is positioned.

Although not shown in FIG. 2, the communication apparatus 100 may include a position detecting function for detecting its relative position with respect to communicating party. Such a position detecting function is realized by, for example, the communication apparatus 100 itself being provided with absolute position measuring means such as a GPS (Global Positioning System) and exchanging mutual position information with the communicating party, or provision of a radar or other means for capturing position information of the communicating party.

Figure 4:
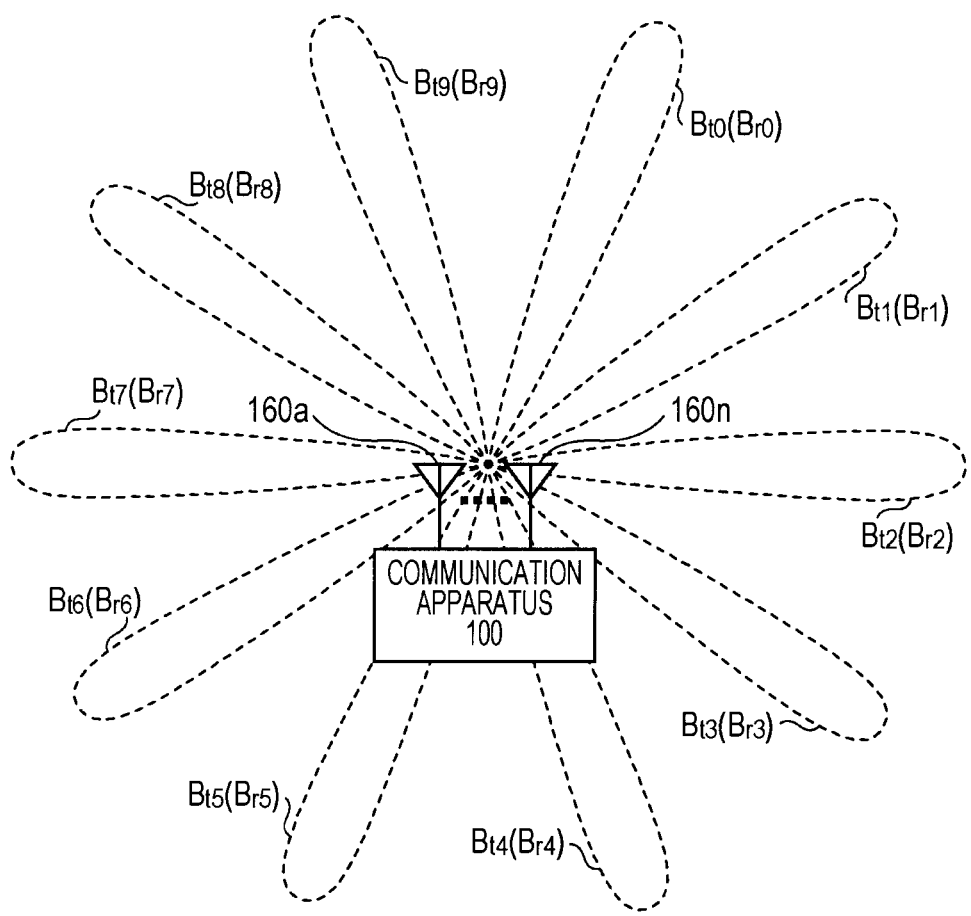
FIG. 4 is a diagram showing 10 transmit beam pattern elements $B_{t0}$ to $B_{t9}$ that can be formed by the communication apparatus 100 through directivity control of a transmit beam by a transmit beam processing section 187.

FIG. 4 shows an example of transmit beam patterns that can be formed by the communication apparatus 100 through directivity control of the transmit beam by the transmit beam processing section 187. In the example shown in the drawing, the communication apparatus 100 can form 10 transmit beam pattern elements $B_{t0}$ to $B_{t9}$. The transmit beam pattern elements $B_{t0}$ to $B_{t9}$ have directivity in directions that differ by 36 degrees in the plane in which the communication apparatus 100 is positioned.

By assigning a weighting coefficient to each of the antennas 160*a* to 160*n* in accordance with a directivity control signal from the control section 190, the transmit beam processing section 187 can form one transmit beam pattern from among these 10 transmit beam pattern elements $B_{t0}$ to $B_{t9}$, thus allowing a directional radio signal to be transmitted. Also, the receive beam patterns that can be formed by the communication apparatus 100 may be beam patterns similar to the transmit beams $B_{t0}$ to $B_{t9}$ shown in FIG. 4. That is, by assigning a weighting coefficient to each of the antennas 160*a* to 160*n* in accordance with a directivity control signal from the control section 190, the receive beam processing section 182 can form a receive beam pattern that matches one of (or a combination of two or more of) such 10 receive beam pattern elements $B_{r0}$ to $B_{r9}$, thus allowing a radio signal according to the millimeter-wave communication mode to be received by each of the antennas 160*a* to 160*n*. Parameter values for identifying the weighting coefficients for the individual antennas 160*a* to 160*n* for forming these transmit and receive beam pattern elements $B_{t0}$ to $B_{t9}$ and $B_{r0}$ to $B_{r9}$, respectively, are stored in advance in the storage section 150 of the communication apparatus 100.

It should be noted that the transmit beam patterns and the receive beam patterns that can be formed by the communication apparatus 100 are not limited to the example shown in FIG. 4. For example, the plurality of antennas 160*a* to 160*n* can be configured so as to be able to form transmit beam patterns or receive beam patterns having directivity in various directions in the three-dimensional space.

Figure 5:
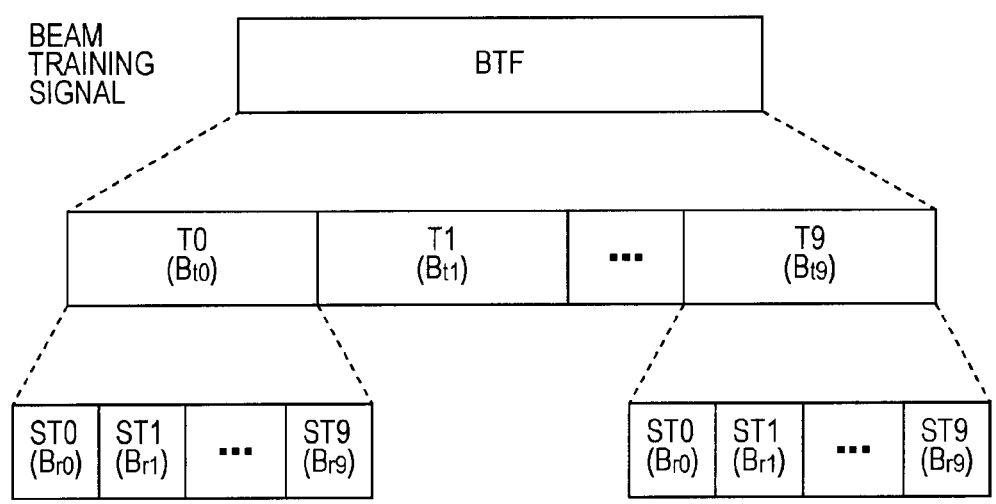
FIG. 5 is a diagram showing an example of the signal format of a beam training signal used for training of an optimal beam direction.

FIG. 5 shows an example of the signal format of a beam training signal used to perform training of an optimal beam direction. It should be noted, however, that in the drawing, description of the header part is omitted. The beam training signal BTF (Beam Training Field) shown in the drawing is transmitted from each of the plurality of antennas 160a to 160c the communicating party has, in accordance with the millimeter-wave communication mode. A training signal sequence to be put on the beam training signal BTF may be, for example, a random pattern according to BPSK (Binary Phase Shift Keying), or the like.

The beam training signal shown in the drawing is obtained by multiplexing training signal sequences for the individual transmit beam pattern elements $B_{t0}$ to $B_{t9}$ by time division. The beam training signal BTF is made up of 10 time slots T0 to T9 respectively corresponding to the transmit beam pattern elements $B_{t0}$ to $B_{t9}$ shown in FIG. 5. Further, in the time slots T0 to T9, 10 training signal sequences are sequentially transmitted, which are obtained by weighting the antennas 160a to 160n by weighting coefficients for forming the transmit beam pattern elements $B_{t0}$ to $B_{t9}$, respectively, with respect to a predetermined known signal sequence. Therefore, the directivity of the transmit beam for the beam training signal sequentially changes in the manner of the transmit beam pattern elements $B_{t0}$ to $B_{t9}$ shown in FIG. 5, for the individual time slots T0 to T9.

At the receiving end that receives this beam training signal BTF, the power level of the receive signal is sequentially observed for each of the time slots T0 to T9 (that is, for each training signal sequence) of the beam training signal BTF. As a result, the power level of the receive signal becomes an outstanding value in one of the time slots of the beam training signal BTF. The time slot in which the power level of the receive signal peaks varies in accordance with the relative position with respect to the transmitting end that transmits the beam training signal BTF. Then, the transmit beam pattern corresponding to the time slot in which the received power level peaks can be determined as an optimal transmit beam pattern for the transmitting end as well.

Also, it is supposed that the receiving end of the beam training signal BTF can also form 10 receive beam pattern elements $B_{r0}$ to $B_{R9}$ similar to the transmit beam pattern elements $B_{t0}$ to $B_{t9}$ shown in FIG. 4. Further, each of the time slots T0 to T9 of the beam training signal BTF is further divided into 10 small segments ST0 to ST9, and in each of the small segments ST0 to ST9, the receive signal is weighted by 10 different receive beam pattern elements $B_{r0}$ to $B_{r9}$. In the example shown in FIG. 5, the first small segment ST0 of the time slot T0 is associated with the receive beam pattern element $B_{r0}$, the second small segment ST1 of the time slot T0 is associated with the receive beam pattern element $B_{r1}, \ldots$, the first small segment ST0 of the time slot T9 is associated with the receive beam pattern element $B_{r0}$, and so on. Through such a directivity control process for the receive beam, with a single beam training signal BTF, receive signals transmitted and received by 10 transmit beam patterns×10 receive beam patterns=a total of 100 transmit and receive beam patterns can be obtained.

The power calculating section 183 shown in FIG. 3 calculates the received powers of the respective receive signals transmitted and received by the total of 100 transmit and receive beam patterns described above, and sequentially outputs the results to the determining section 184. Then, on the basis of the received power values inputted, the determining section 184 determines parameter values for identifying optimal transmit beam pattern and receive beam pattern. An optimal beam pattern is typically such a beam pattern with which the series of received power values inputted from the power calculating section 183 for a single beam training signal becomes maximum. The parameter value for identifying an optimal transmit beam pattern may be, for example, one of the time slot numbers (t0 to T9) of the beam training signal BTF. Also, the parameter value for identifying an optimal transmit beam pattern may be, for example, the small segment number (ST0 to ST9) shown in FIG. 5. The determining section 184 outputs the parameter values determined in this way to the control section 190. Also, the parameter value (T0 to T9) for identifying an optimal transmit beam pattern may be fed back to the transmitting end of the beam training signal BTF. It should be noted, however, that since this feedback procedure is not directly related to the scope of the present invention, description thereof is omitted in this specification.

Radio communication systems utilizing millimeter wave can extend their signal reaching range by using a plurality of transmit and receive antennas to form a sharp antenna directivity (that is, a beam-shaped antenna directivity). However, as has been already described in the Background section, there is a problem in that in mobile environments with many moving objects, it is difficult to utilize directional millimeter-wave communication. Also, even in the case of re-establishing a link with the communicating party with which a link was previously established, frames (such as preparation frames) are first exchanged without using directivity, and after the direction of directivity is determined on the basis of the condition of their reception, data transmission/reception using the directivity is performed. Thus, there is a problem in that overhead is introduced.

Accordingly, in a first embodiment of the present invention, the communication apparatus 100 is configured to transmit a preparation frame by using a beam pattern having directivity when establishing a link, thereby efficiently establishing a directional link to reduce overhead.

Also, in a second embodiment of the present invention, the communication apparatus 100 is configured to receive a preparation frame by using a beam pattern having directivity when establishing a link, thereby efficiently establishing a directional link to reduce overhead.

Figure 6:
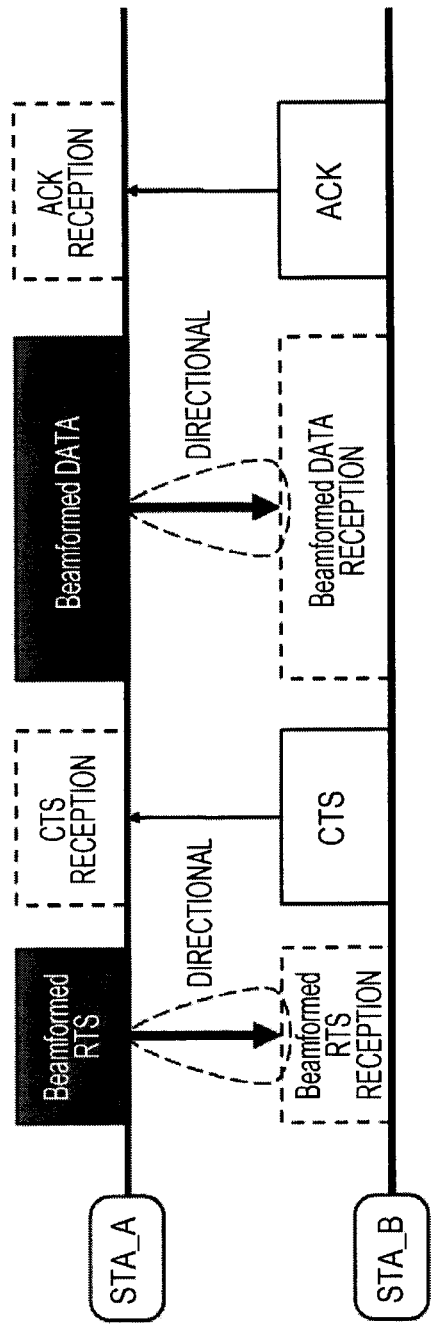
FIG. 6 is a diagram showing an example of a signal transmission/reception sequence which performs a transmitting operation by using the same transmit beam pattern as the last used one when re-establishing a link, according to a first embodiment of the present invention.

FIG. 6 shows an example of a signal transmission/reception sequence which transmits a preparation frame by using a beam pattern having directivity when establishing a link. In the signal transmission/reception sequence shown in the drawing, RTS/CTS handshake is utilized, which is a common methodology for solving the terminal problem. It should be noted, however, that each of communication stations STA_A and STA_B is formed by the communication apparatus 100 shown in FIGS. 2 and 3.

The data transmitting end (STA_A) first confirms that the medium is clear for a predetermined period by the CSMA/CA (Carrier Sense Multiple Access with Collision Avoidance) procedure, and thereafter, transmits an RTS frame, which is a preparation frame requesting for start of data transmission, toward the data receiving end (STA_B) by using a beam pattern having directivity (Beamformed RTS).

Upon receiving the RTS frame addressed to the data receiving end (STA_B) from the data transmitting end (STA_A), after the elapse of a predetermined inter-frame space SIFS, the data receiving end (STA_B) transmits a CTS frame which is a preparation frame notifying confirmation of the data transmission start request mentioned above.

After transmitting the RTS frame, the data transmitting end (STA_A) waits for a reception of the CTS frame replied from the data receiving end (STA_B). Then, upon confirming that the medium is clear by receiving the CTS frame, after the elapse of SIFS from the reception of the CTS frame, the data transmitting end (STA_A) transmits a data frame DATA for which the transmit beam is addressed to the data receiving end (STA_B), by using a beam pattern having directivity (Beamformed DATA). It should be noted that when receiving the CTS frame, the data transmitting end (STA_A) may update the state of a directional communication link, such as by optimizing the transmit beam pattern being saved by using part of the field in this received frame.

After transmitting the CTS frame, the data receiving end (STA_B) waits for a reception of the data frame from the data transmitting end (STA_A). At that time, the data receiving end (STA_B) may use a beam pattern having directivity whose receive beam is directed in the direction of the position of the data transmitting end (STA_A). Then, the data receiving end (STA_B) replies an ACK upon successfully finishing reception of the data frame. By receiving the ACK, the data transmitting end (STA_A) recognizes the successful completion of the series of RTS/CTS handshake procedure.

Here, as an example of the method of determining directivity when transmitting a preparation frame upon establishment of a link, it is possible to cite a method in which, when transmitting a frame by re-establishing a link with a communicating party with which a directional link was previously established, the same transmit beam pattern as that used when last transmitting a frame to the same communicating party is used.

Figure 7:
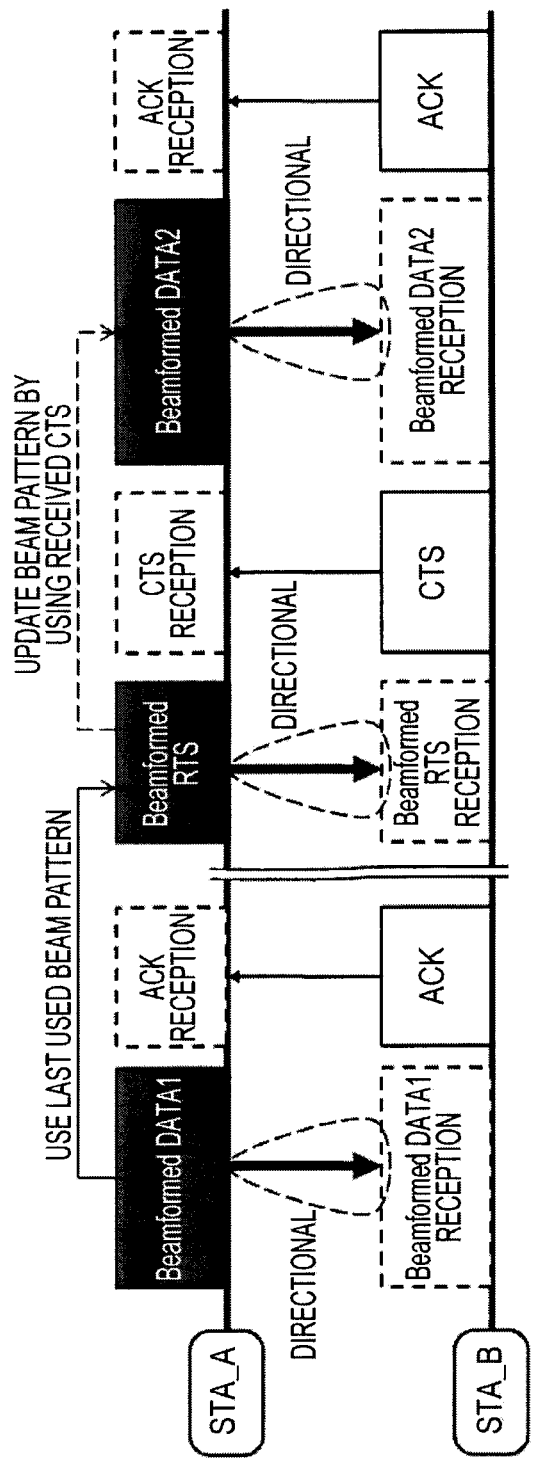
FIG. 7 is a diagram showing an example of a signal transmission/reception sequence which transmits a preparation frame by using the same transmit beam pattern as that used when last transmitting a frame to the same communicating party.

FIG. 7 shows an example of a signal transmission/reception sequence which transmits a preparation frame by using the same transmit beam pattern as that used when last transmitting a frame to the same communicating party. Like FIG. 6, this drawing also shows an example of the transmit/receive sequence for signals to be transmitted. Also, it is supposed that each of the communication stations STA_A and STA_B is formed by the communication apparatus 100 shown in FIGS. 2 and 3.

The data transmitting end (STA_A) transmits a data frame DATA1 addressed to the data receiving end (STA_B), by using a beam pattern having directivity that has already been trained (Beamformed DATA1).

In contrast, the data receiving end (STA_B) replies an ACK upon successfully finishing reception of the data frame DATA1. By receiving the ACK, the data transmitting end (STA_A) recognizes the successful completion of the series of RTS/CTS handshake procedure.

Thereafter, when a data transmission request occurs again, the data transmitting end (STA_A) confirms that the medium is clear through the CSMA/CA procedure, and then transmits a preparation frame RTS, by using the beam pattern having directivity previously used when transmitting the data frame DATA1 (Beamformed RTS).

Upon receiving the RTS frame addressed to the data receiving end (STA_B) from the data transmitting end (STA_A), after the elapse of a predetermined inter-frame space SIFS, the data receiving end (STA_B) transmits a CTS frame which is a preparation frame notifying confirmation of the data transmission start request mentioned above.

After transmitting the RTS frame, the data transmitting end (STA_A) waits for a reception of the CTS frame replied from the data receiving end (STA_B). Then, upon confirming that the medium is clear by receiving the CTS frame, after the elapse of SIFS from the reception of the CTS frame, the data transmitting end (STA_A) transmits a data frame DATA for which the transmit beam is addressed to the data receiving end (STA_B), by using a beam pattern having directivity (Beamformed DATA). It should be noted that when receiving the CTS frame, the data transmitting end (STA_A) may update the state of a directional communication link, such as by optimizing the transmit beam pattern being saved by using part of the field in this received frame.

After transmitting the CTS frame, the data receiving end (STA_B) waits for a reception of the data frame from the data transmitting end (STA_A). At that time, the data receiving end (STA_B) may use a beam pattern having directivity whose receive beam is directed in the direction of the position of the data transmitting end (STA_A). Then, the data receiving end (STA_B) replies an ACK upon successfully finishing reception of the data frame. By receiving the ACK, the data transmitting end (STA_A) recognizes the successful completion of the series of RTS/CTS handshake procedure.

The signal transmission/reception sequence shown in FIG. 7 is based on the assumption that the state of the directional link between each communication station remains unchanged and valid during the time from the last frame transmission to the next frame transmission. However, in mobile environments with many moving objects, there is a possibility that the state of the directional link changes due to the subsequent movement of communication stations or the presence of obstacles.

Figure 8A:
FIG. 8A is a diagram for explaining changes in the state of a directional link.
Figure 8B:
FIG. 8B is a diagram for explaining changes in the state of a directional link.
Figure 8C:
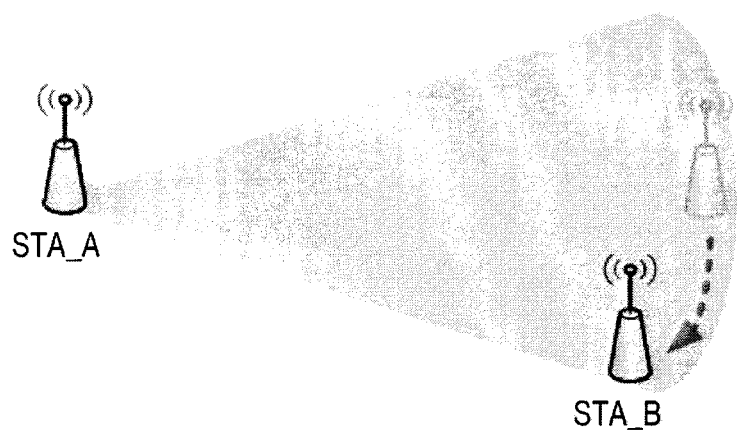
FIG. 8C is a diagram for explaining changes in the state of a directional link.

In the case where the communication beam has been optimized at the time of the last frame transmission, the beam pattern is sharp, which makes it possible for the transmitting end (STA_A) to extend the signal reaching distance (see FIG. 8A). However, the directional link becomes valid merely with a slight movement of the receiving end (STA_B) (or merely with a slight displacement in the relative position between communication stations) (see FIG. 8B). As a measure against such a problem, one conceivable method is to make the transmit beam pattern broader when using the transmit beam pattern used at the time of the last frame transmission (see FIG. 8C). Making the transmit beam pattern broader shortens the signal reaching distance but expands the area of the signal reaching range, which is expected to lead to the increased probability of being able to contain the communicating party that has changed in relative position within the signal reaching range.

Figure 8D:
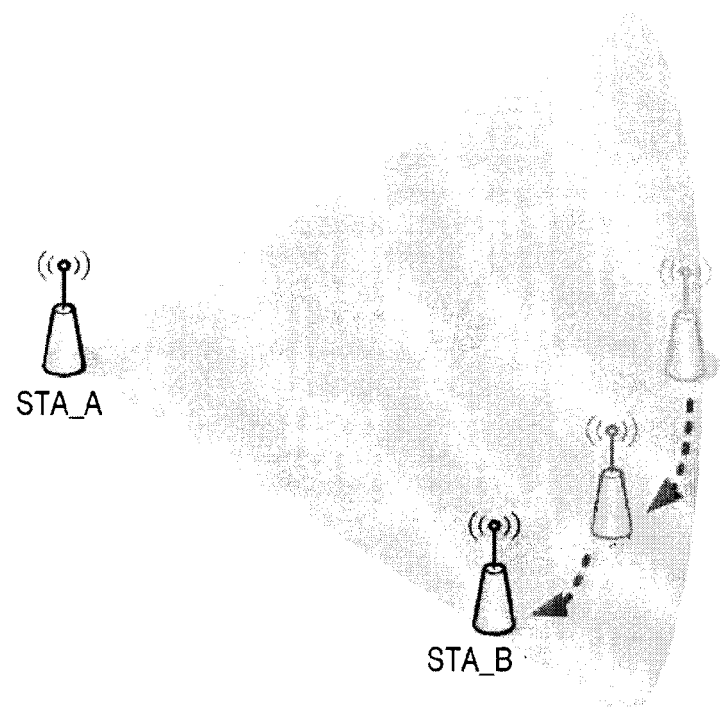
FIG. 8D is a diagram for explaining changes in the state of a directional link.

Also, it is predicted that the relative position between communication stations will change greatly with the elapsed time from the last frame transmission. Accordingly, another conceivable method is such that the degree to which to make the beam pattern broader is adjusted so as to become greater with the elapsed time from the last frame transmission (see FIG. 8D).

Also, even if the beam pattern adjustment method as mentioned above is adopted, unless the communicating party can be contained within the signal reaching range, the directional link cannot be made valid, making it impossible to receive a response frame. In such a case, there is absolutely no point in performing directional communication, so a switch to omni-directional communication should be made.

Figure 9:
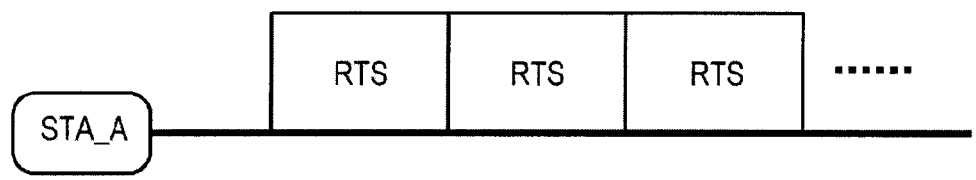
FIG. 9 is a diagram showing how part or entirely of a frame is transmitted a plurality of times.

Here, when transmitting a frame omni-directionally, by transmitting part or entirety of the frame a plurality of times (see FIG. 9), although overhead increases, the signal reaching range can be extended.

In cases such as when response of a CTS frame to an RTS frame cannot be obtained no matter how much the transmit beam pattern is made broader, the communication apparatus 100 should take measures such as transmitting an RTS frame omni-directionally, performing repetitive transmissions with large overhead, or performing training at the time of an optimal transmit beam pattern.

The transmit beam patterns that can be formed by the communication apparatus 100 through directivity control of the transmit beam by the transmit beam processing section 187 are, for example, as shown in FIG. 4.

Figure 10A:
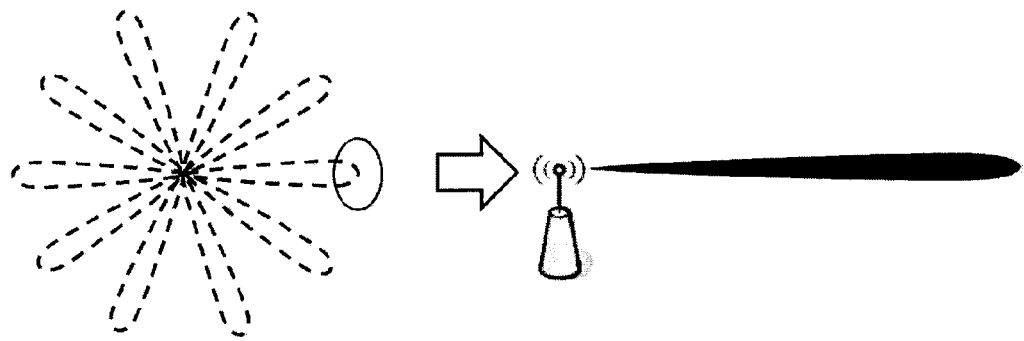
FIG. 10A is a diagram for explaining a method of adjusting the signal reaching range by selectively using the 10 transmit beam pattern elements $B_{t0}$ to $B_{t9}$ shown in FIG. 4.

It is shown in FIG. 4 that the plurality of transmit beam pattern elements $B_{t0}$ to $B_{t9}$ are formed through directivity control of the transmit beam. For example, as shown at left in FIG. 10A, when only one transmit beam pattern element $B_{t2}$ is selected and used while being weighted, as shown at right in FIG. 10A, a transmit beam that is sharp and gives a long signal reaching distance can be obtained.

Figure 10B:
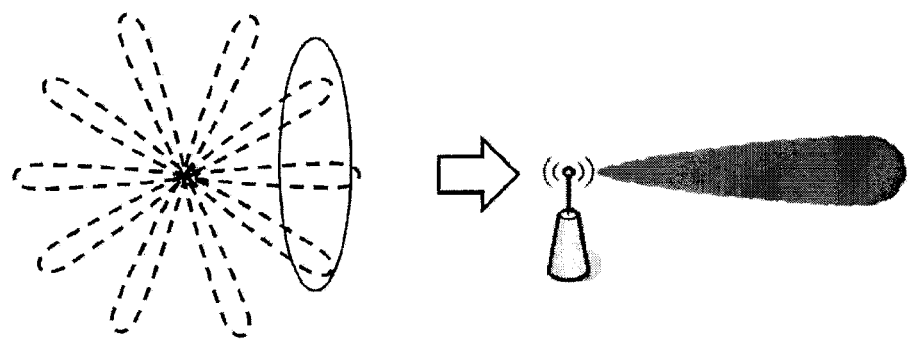
FIG. 10B is a diagram for explaining a method of adjusting the signal reaching range by selectively using the 10 transmit beam pattern elements $B_{t0}$ to $B_{t9}$ shown in FIG. 4.
Figure 10C:
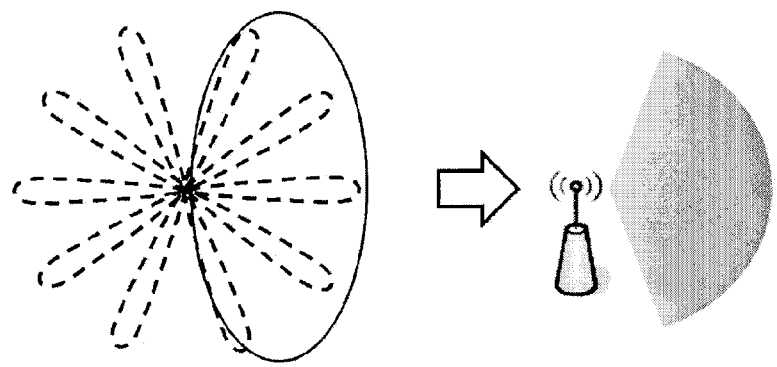
FIG. 10C is a diagram for explaining a method of adjusting the signal reaching range by selectively using the 10 transmit beam pattern elements $B_{t0}$ to $B_{t9}$ shown in FIG. 4.
Figure 10D:
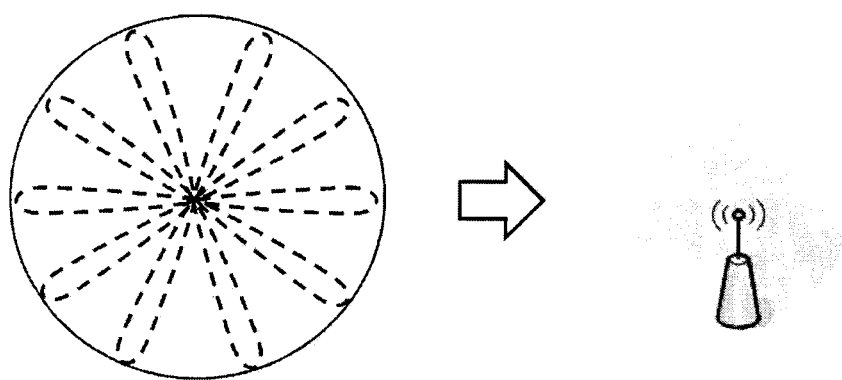
FIG. 10D is a diagram for explaining a method of adjusting the signal reaching range by selectively using the 10 transmit beam pattern elements $B_{t0}$ to $B_{t9}$ shown in FIG. 4.

In contrast, by weighting and summing a plurality of transmit beam pattern elements, it is possible to obtain a transmit beam that gives a wider signal reaching range even through the signal reaching distance becomes shorter. For example, as shown at left in FIG. 10B, when three transmit beam pattern elements including the transmit beam pattern element $B_{t2}$ and the transmit beam patterns $B_{t1}$ and $B_{t3}$ adjacent to this transmit beam pattern element are selected, and these transmit beam pattern elements are weighted and summed, as shown at right in FIG. 10B, although the signal reaching distance becomes shorter, the signal reaching range becomes wider. Also, as shown at left in FIG. 10C, when five transmit beam pattern elements including the transmit beam pattern element $B_{t2}$ and the transmit beam patterns $B_{t0}$, $B_{t1}$, $B_{t3}$, and $B_{t4}$ adjacent to this transmit beam pattern element are selected, and these transmit beam pattern elements are weighted and summed, as shown at right in FIG. 10C, although the signal reaching distance becomes further shorter, the signal reaching range becomes even wider. From the drawings, it can be appreciated that the signal reaching range widens with an increase in the prime numbers for the transmit beam patterns that are weighted and summed. Further, as shown at left in FIG. 10D, when all of the transmit beam pattern elements $B_{t0}$ to $B_{t9}$ are selected and equally weighted, as shown at right in FIG. 10D, an omni-directional transmit beam pattern with a short signal reaching distance results.

Figure 11:
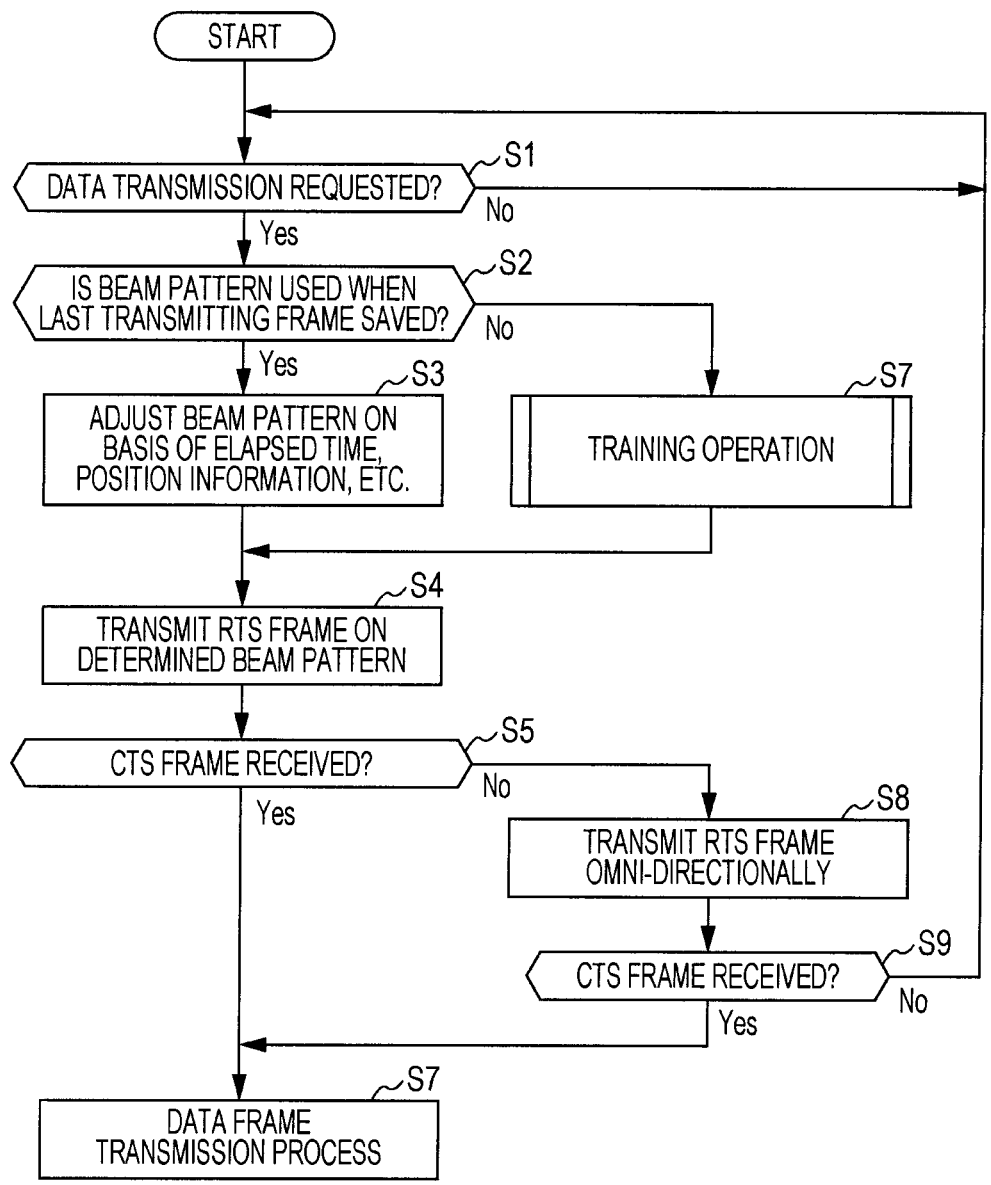
FIG. 11 is a flowchart showing a procedure for the communication apparatus 100 to perform a communication operation as the data transmitting end (STA_A), according to the first embodiment of the present invention.

FIG. 11 shows, in the form of a flowchart, a procedure for the communication apparatus 100 to perform a frame transmitting operation as the data transmitting end (STA_A) in FIG. 7, in the first embodiment mentioned above. This procedure is implemented through, for example, execution of a predetermined control program by the control section 190.

When a data transmission request occurs from the upper layer of the communication protocol or the like (Yes in step S1), the communication apparatus 100 first checks whether or not the transmit beam pattern used when last transmitting a data frame (or a directional frame) to the data transmitting end (STA_B) is saved (step S2). Specifically, the control section 190 checks whether or not a parameter value for identifying the last used transmit beam pattern is saved in the storage section 150.

If the last used transmit beam pattern is saved (Yes in step S2), the communication apparatus 100 adjusts the transmit beam pattern in accordance with the elapsed time from when last transmitting a data frame to the data receiving end (STA_B) (step S3). That is, upon identifying the last used transmit beam pattern by extracting a parameter value from the storage section 150, the control section 190 adjusts the transmit beam pattern so as to become broader in accordance with the elapsed time. It should be noted that at the time of the judgment step S2, a threshold may be set for the elapsed time so that the last used transmit beam pattern is not used again if a predetermined time or more has elapsed.

On the other hand, if the transmit beam pattern used when last transmitting a frame to the data receiving end (STA_B) is not saved (No in step S2), the communication apparatus 100 determines a transmit beam pattern by conducting a training operation for performing training of an optimal transmit beam directivity, with the data receiving end (STA_B) (step S7). Since the scope of the present invention is not limited to a specific training operation, a detailed description of the training operation is omitted here.

Next, by using the transmit beam pattern determined by step S3 or step S7, the communication apparatus 100 transmits an RTS frame (Beamformed RTS) to the data receiving end (STA_B) (step S4). The control section 190 controls the transmit beam processing section 187 so as to form this determined transmit beam pattern.

Then, upon receiving a CTS frame from the data receiving end (STA_B) within a predetermined period (Yes in step S5), the communication apparatus 100 starts a transmission process for a data frame to the data receiving end (STA_B) (step S6).

Also, when the communication apparatus 100 cannot successfully receive a CTS frame from the data receiving end (STA_B) within a predetermined period (No in step S5), there is a possibility that the RTS frame did not reach because the data receiving end (STA_B) has moved by more than an amount predicted in accordance with the elapsed time. In such a case, it is also conceivable to widen the directivity so that the RTS frame reaches the data receiving end (STA_B). Accordingly, the control section 190 controls the transmit beam processing section 187 so that the transmit beam pattern becomes omni-directional, thus transmitting an omni-directional RTS frame (step S8).

Then, upon successfully receiving a CTS frame from the data receiving end (STA_B) within a predetermined time after transmitting the omni-directional RTS frame (Yes in step S9), the communication apparatus 100 starts a transmission process for a data frame to the data receiving end (STA_B) (step S6).

It should be noted that if the parameter value for identifying the last used transmit beam pattern is not saved in step S2, instead of proceeding to step S7 to perform a training operation, the processing may proceed to step S8 to transmit an omni-directional RTS frame.

Also, in the case where the communication apparatus includes a position detecting function for detecting its relative position with respect to communicating party, in step S3, when using the transmit beam pattern used when last transmitting a data frame (or a directional frame), in addition to the elapsed time from the last frame transmission, the relative position information with respect to the data receiving end (STA_B) may be also taken into account in adjusting the transmit beam pattern.

Subsequently, the second embodiment of the present invention will be described. In the second embodiment, when establishing a link, the communication apparatus 100 receives a preparation frame by using a beam pattern having directivity. In this case, it is necessary for the communication apparatus 100 to grasp the transmission timing of the preparation frame from the communicating party.

Methods for grasping the transmission timing of a preparation frame from the communicating party include a method of allocating transmission timing to the communicating party, and a method using a procedure in which an inter-frame space (IFS: Inter Frame Space) is prescribed, such as RTS/CTS handshake.

For example, consider a case in which in an infrastructure network, an access point (AP) performs scheduling of transmission segments for its subordinate terminal stations (STA1 and STA2), and each of the terminal stations (STA1 and STA2) transmits data to the access point (AP) by using the RTS/CTS handshake procedure within its own allocated transmission segment. For the access point (AP), the timing at which each of the terminal stations (STA1 and STA2) transmits a preparation frame within its transmission segment is known. Also, for each of the terminal stations (STA1 and STA2), the timing at which the access point (AP) transmits a preparation frame after the terminal station transmits a preparation frame RTS is known.

Figure 12:
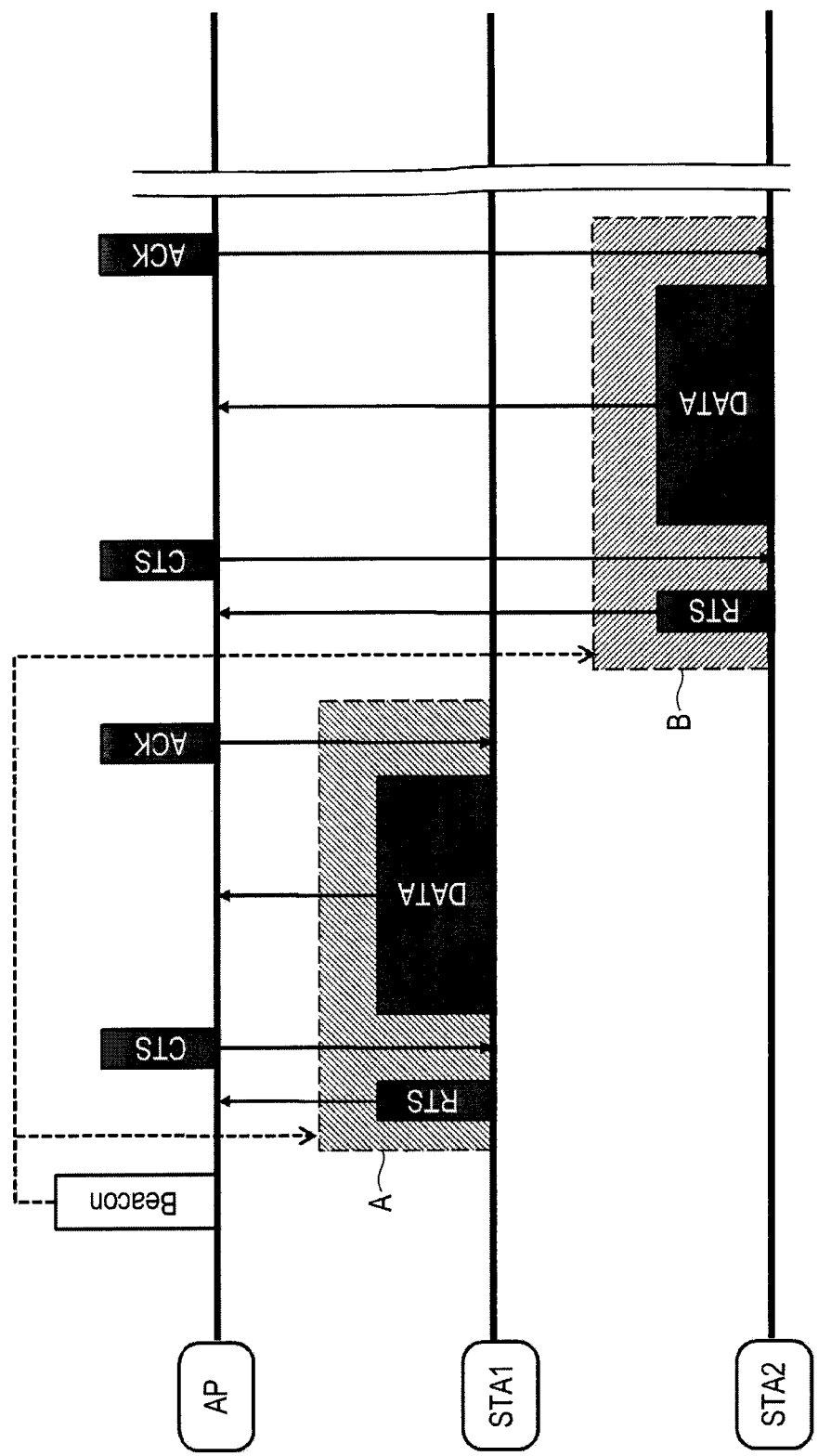
FIG. 12 is a diagram showing an example of a signal transmission/reception sequence which performs a receiving operation by using the same receive beam pattern as the last used one when re-establishing a link, according to a second embodiment of the present invention.

FIG. 12 shows an example of a signal transmission/reception sequence between the access point (AP) and the terminal stations (STA). In the following, with reference to the signal transmission/reception sequence example shown in the drawing, a description will be given of an operation in which when establishing a link, the communication apparatus 100 receives a preparation frame by using a beam pattern having directivity.

The access point (AP) broadcasts a beacon at every predetermined frame cycle. By receiving this, each of the terminal stations (STA1 and STA2) is placed subordinate to the access point (AP), thus securing coordination in the BSS. In the beacon, as operation information for the BSS, schedule information such as the transmission timing allocated to each of the terminal stations (STA1 and STA2) is described. In the example shown in FIG. 12, in accordance with the schedule information described in the beacon, within the frame cycle, the segment indicated by left diagonal lines is allocated as a transmission segment according to a second communication mode for one of the terminal stations (STA1), and the segment indicated by right diagonal lines is allocated as a transmission segment according to the second communication mode for the other terminal station (STA2). The terminal stations (STA1 and STA2) can perform radio communication in a contention free manner in their respective transmission segments.

The terminal station (STA1) transmits an RTS frame toward the access point (AP), after the elapse of a predetermined period after entering the transmission segment allocated to the terminal station (STA1) (the region indicated by reference symbol A in FIG. 12).

On the other hand, upon arrival of the start time of the transmission segment allocated to the terminal station (STA1), the access point (AP) starts a receiving operation for the RTS frame, by controlling the directivity of the receive beam processing section 182 so as to optimize the receive beam pattern with respect to the terminal station (STA1). Alternatively, the access point (AP) waits for the RTS frame by using the beam pattern used when last receiving a data frame from the terminal station (STA1). Then, in response to the reception of the RTS frame from the terminal station (STA1), after the elapse of a predetermined inter-frame space SIFS (Short Inter Frame Space), the access point (AP) replies a CTS frame feeding back an indication that the RTS frame has been successfully received.

Upon elapse of the predetermined inter-frame space SIFS after completing transmission of the RTS frame, the terminal station (STA1) waits for the CTS frame by using the beam pattern used when last receiving a frame from the access point (AP). Then, upon confirming that the medium is clear through successful reception of the CTS frame, after the elapse of SIFS, the terminal station (STA1) transmits a data frame while directing the transmit beam in the direction of the position of the access point (AP).

After transmitting the CTS frame, the access point (AP) waits for the data frame by using the beam pattern used when last receiving a data frame. At this time, when receiving the RTS frame from the terminal station (STA1), the access point (AP) may update the state of the directional communication link, such as by optimizing the receive beam pattern being saved by using part of the field in this received frame. Then, upon successfully finishing reception of the data frame from the terminal station (STA1), the access point (AP) replies an ACK frame after the elapse of SIFS.

The terminal station (STA1) waits for the ACK frame by using the beam pattern used when last receiving the CTS frame. At this time, when receiving the CTS frame from the access point (AP), the terminal station (STA1) may update the state of the directional communication link, such as by optimizing the receive beam pattern being saved by using part of the field in this received frame. Then, by receiving the ACK frame, the terminal station (STA1) recognizes the successful completion of the series of RTS/CTS handshake procedure.

Likewise, the terminal station (STA2) transmits an RTS frame toward the access point (AP), after the elapse of a predetermined period after entering the transmission segment allocated to the terminal station (STA2) (the region indicated by reference symbol B in FIG. 12).

On the other hand, upon arrival of the start time of the transmission segment allocated to the terminal station (STA2), the access point (AP) starts a receiving operation for the RTS frame, by controlling the directivity of the receive beam processing section 182 so as to optimize the receive beam pattern with respect to the terminal station (STA2). Alternatively, the access point (AP) waits for the RTS frame by using the beam pattern used when last receiving a data frame from the terminal station (STA2). Then, in response to the reception of the RTS frame from the terminal station (STA2), after the elapse of a predetermined inter-frame space SIFS, the access point (AP) replies a CTS frame feeding back an indication that the RTS frame has been successfully received.

Upon elapse of the predetermined inter-frame space SIFS after completing transmission of the RTS frame, the terminal station (STA2) waits for the CTS frame by using the beam pattern used when last receiving a frame from the access point (AP). Then, upon confirming that the medium is clear through successful reception of the CTS frame, after the elapse of SIFS, the terminal station (STA2) transmits a data frame while directing the transmit beam in the direction of the position of the access point (AP).

After transmitting the CTS frame, the access point (AP) waits for the data frame by using the beam pattern used when last receiving a data frame. At this time, when receiving the RTS frame from the terminal station (STA2), the access point (AP) may update the state of the directional communication link, such as by optimizing the receive beam pattern being saved by using part of the field in this received frame. Then, upon successfully finishing reception of the data frame from the terminal station (STA2), the access point (AP) replies an ACK frame after the elapse of SIFS.

The terminal station (STA2) waits for the ACK frame by using the beam pattern used when last receiving the CTS frame. At this time, when receiving the CTS frame from the access point (AP), the terminal station (STA2) may update the state of the directional communication link, such as by optimizing the receive beam pattern being saved by using part of the field in this received frame. Then, by receiving the ACK frame, the terminal station (STA2) recognizes the successful completion of the series of RTS/CTS handshake procedure.

The signal transmission/reception sequence shown in FIG. 12 is based on the assumption that the state of the directional link between each communication station remains unchanged and valid during the time from the last frame reception to the next frame reception. However, in mobile environments with many moving objects, there is a possibility that the state of the directional link changes due to the subsequent movement of communication stations or the presence of obstacles. Accordingly, the adjustment method as shown in FIGS. 8A to 8D, which makes the transmit beam pattern broader in accordance with the elapsed time from the last frame transmission, also applies to when receiving a frame. That is, immediately after the communication beam is optimized when last receiving a frame, the receivable distance is extended by making the receive beam pattern sharp. Thereafter, by taking into account the fact that the communicating party moves with the elapsed time, the receive beam pattern is adjusted so as to become gradually broader. Making the receive beam pattern broader shortens the receivable distance but expands the area of the receivable range, which is expected to lead to the increased probability of being able to contain the communicating party that has changed in relative position within the receivable range.

The receive beam patterns that can be formed by the communication apparatus 100 through directivity control of the transmit beam by the receive beam processing section 182 are, for example, as shown in FIG. 4. Further, as shown in FIGS. 10A to 10D, a desired receivable distance and receivable range can be set in accordance with the method of selecting the receive beam pattern elements $B_{r0}$ to $B_{r9}$.

Figure 13:
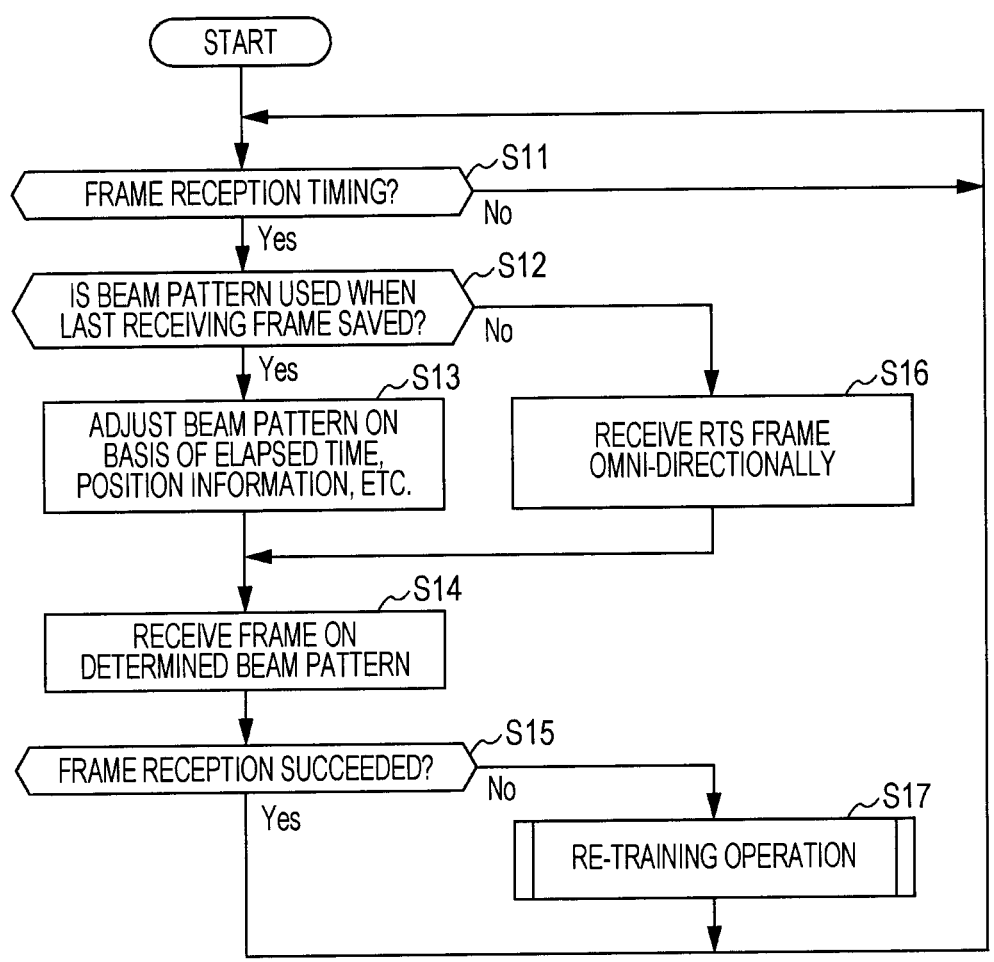
FIG. 13 is a flowchart showing a procedure for a communication apparatus to perform a frame receiving operation as an access point (AP) or as each of terminal stations (STA1 and STA2).

FIG. 13 shows, in the form of a flowchart, a procedure for the communication apparatus to perform a frame receiving operation as an access point (AP) or as each of the terminal stations (STA1 and STA2). This procedure is implemented through, for example, execution of a predetermined control program by the control section 190.

When the frame reception timing arrives (Yes in step S11), the communication apparatus 100 first checks whether or not the receive beam pattern used when last receiving a frame from the same frame's source is saved (step S12).

Examples of the frame reception timing include when, as an access point (AP), for example, a transmission segment is allocated to the frame's source, the transmission timing of a CTS frame or a data frame from the communication party upon elapse of a predetermined inter-frame space SIFS after completing transmission of a preparation frame such as RTS or CTS, and the transmission timing of an ACK frame from the communicating party upon elapse of a predetermined inter-frame space SIFS after completing transmission of a data frame.

If the receive beam pattern last used for the same communicating party is saved (Yes in step S12), the communication apparatus 100 adjusts the receive beam pattern in accordance with the elapsed time from the last frame reception from the same communicating party (step S13). That is, upon identifying the last used receive beam pattern by extracting a parameter value from the storage section 150, the control section 190 adjusts the receive beam pattern so as to become broader in accordance with the elapsed time. Then, the communication apparatus 100 waits for a frame from the communicating party by using the receive beam pattern determined in step S13 (step S14). It should be noted that at the time of the judgment step S12, a threshold may be set for the elapsed time so that the last used receive beam pattern is not used again if a predetermined time or more has elapsed.

On the other hand, if the receive beam pattern used when last receiving a frame from the same communicating party is not saved, in the communication apparatus 100, the control section 190 controls the receive beam processing section 187 so that the receive beam pattern becomes omni-directional, thus waiting for a reception of a frame omni-directionally (step S16).

Here, if the frame reception fails (No in step S15), the communication apparatus 100 determines a receive beam pattern by carrying out a training operation for performing training of an optimal receive beam directivity, with the communicating party (step S17). Since the scope of the present invention is not limited to a specific training operation, a detailed description of the training operation is omitted here.

It should be noted that if the parameter value for identifying the last used receive beam pattern is not saved in step S12, the processing may proceed to step S7, and a training operation may be performed, instead of proceeding to step S16 to transmit an omni-directional frame.

Also, in the case where the communication apparatus includes a position detecting function for detecting its relative position with respect to communicating party, in step S13, when using the receive beam pattern used when last receiving a frame with respect to the same communicating party, in addition to the elapsed time from the last frame reception, the relative position information with respect to the data transmitting end (STA_A) may be also taken into account in adjusting the receive beam pattern.

According to the signal transmission/reception sequence shown in FIGS. 6, 7, and 12, it can be appreciated that in millimeter-wave communication utilizing directivity control to solve the flight distance problem, by effectively utilizing the beam pattern used at the time of the last communication, a directional link can be effectively established, and overhead can be reduced.

It should be noted that the communication apparatus 100 operating as an access point (AP) or a terminal station (STA) may be, for example, a personal computer (PC), a portable telephone, a portable information terminal such as a PDA (Personal Digital Assistant), a portable music player, or information equipment such as a game machine, or a radio communication module incorporated in a television receiver or other home information equipment.

Figure 14:
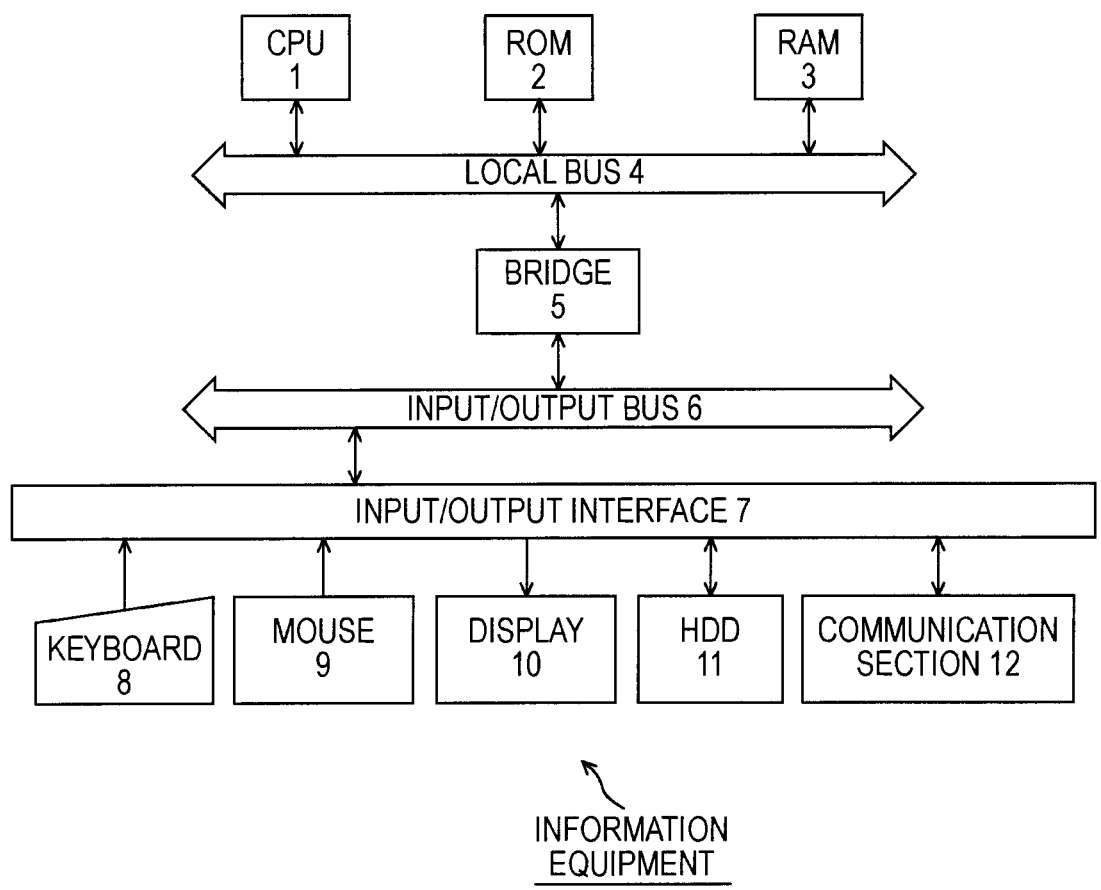
FIG. 14 is a diagram showing an example of the configuration of information equipment incorporating the communication apparatus 100 that is modularized.

FIG. 14 shows an example of the configuration of information equipment incorporating the communication apparatus 100 that is modularized.

A CPU (Central Processing Unit) 1 executes a program stored in a ROM (Read Only Memory) 2 or a hard disk drive (HDD) 11, under a program execution environment provided by the operating system (OS). For example, a receive frame synchronization process described later or part of the process can be implemented also in the form of the CPU 1 executing a predetermined program.

The ROM 2 permanently stores program codes such as POST (Power On Self Test) and BIOS (Basic Input Output System). A RAM (Random Access Memory) 3 is used for loading a program stored in the ROM 2 or the HDD (Hard Disk Drive) 11 when the CPU 1 executes the program, or for temporarily retaining the working data of the program being executed. These are connected to each other via a local bus 4 that is direct-coupled to the local pin of the CPU 1.

The local bus 4 is connected to an input/output bus 6 such as a PCI (Peripheral Component Interconnect) bus via a bridge 5.

A keyboard 8, and a pointing device 9 such as a mouse are input devices operated by the user. A display 10 is formed by an LCD (Liquid Crystal Display) or a CRT (Cathode Ray Tube), and displays various information in the form of text or images.

The HDD 11 is a drive unit with a built-in hard disk serving as a recording medium, and drives the hard disk. The hard disk is used to install programs executed by the CPU 1 such as the operating system and various applications, and to save various data files or the like.

A communication section 12 is a radio communication interface formed by modularizing the radio communication apparatus 100. The communication section 12 operates as an access point or a terminal station under infrastructure mode, or operates under ad-hoc mode, and executes communication with other communication terminals that exist within the signal reaching range. The operation of the radio communication apparatus 100 is as already described above.

INDUSTRIAL APPLICABILITY

In the foregoing, the present invention has been described in detail with reference to specific embodiments. However, it is obvious that a person skilled in the art can make various modifications to and substitutions for the embodiments without departing from the scope of the present invention.

In this specification, the description is mainly focused on embodiments using the 60-GHz band used in IEEE802.15.3c as the millimeter-wave communication mode. However, the scope of the present invention is not necessarily limited to a specific frequency band. Also, not only millimeter-wave communication but also other kinds of directional communication may apply.

In short, the present invention has been disclosed by way of examples, and the descriptions of this specification should not be construed restrictively. The scope of the present invention should be determined by reference to the claims.

REFERENCE SIGNS LIST

1 CPU
2 ROM
3 RAM
4 local bus
5 bridge
6 input/output bus
7 input/output interface
8 keyboard
9 pointing device (mouse)
10 display
11 HDD
12 communication section
100 communication apparatus
150 storage section
160a to 160n plural antennas
170 radio communication section
172 analog section
174 AD conversion section
176 DA conversion section
180 digital section
181 synchronization section
182 receive beam processing section
183 power calculating section
184 determining section
185 demodulation/decoding section
186 encoding/modulation section
187 transmit beam processing section
190 control section

The invention claimed is:

1. A communication apparatus comprising:
a radio communication section configured to perform directional radio communication in accordance with a communication mode using a predetermined high frequency band,
wherein the communication apparatus performs the directional radio communication of a predetermined preparation frame by controlling a directivity of the radio communication section, when starting data transmission after exchanging the predetermined preparation frame with a communicating party,
wherein the communication apparatus performs the directional radio communication of the predetermined preparation frame by using a communication beam pattern used for performing a prior frame exchange with the communicating party, and
wherein the communication apparatus adjusts the communication beam pattern in accordance with an elapsed time from the prior frame exchange with the communicating party.

2. The communication apparatus according to claim 1, wherein when the communication beam pattern used to perform the prior frame exchange with the communicating party is not retained, the communication apparatus performs communication of the predetermined preparation frame by using an omni-directional communication beam pattern, or performs communication of the predetermined preparation frame by using another communication beam pattern obtained by executing a training operation with the communicating party.

3. The communication apparatus according to claim 1, wherein
a procedure is applied in which a data transmitting end starts a transmission process of a data frame after transmitting a transmission start request frame (RTS: Request to Send) and receiving a confirmation frame (CTS: Clear to Send) replied from a data receiving end; and
when operating as the data transmitting end, the communication apparatus transmits the transmission start request frame by using a transmit beam pattern directed in a direction of a position of the data receiving end.

4. The communication apparatus according to claim 3, wherein when the communication apparatus is unable to receive the confirmation frame from the data receiving end in response to transmission of the transmission start request frame using the transmit beam pattern directed in the direction of the position of the data receiving end, the communication apparatus retransmits the transmission start request frame by using an omni-directional transmit beam pattern.

5. The communication apparatus according to claim 1, wherein the communication apparatus waits for a reception of a frame whose transmission timing from the communicating party is known, by using a receive beam pattern directed in a direction of a position of the communicating party.

6. The communication apparatus according to claim 1, wherein the communication apparatus notifies information related to a transmission segment allocated to the communicating party, and within the transmission segment, waits for a reception by using a receive beam pattern directed in a direction of a position of the communicating party.

7. The communication apparatus according to claim 1, wherein
a procedure is applied in which a data transmitting end transmits a transmission start request frame, a data receiving end replies a confirmation frame after elapse of a first predetermined period from reception of the transmission start request frame, the data transmitting end starts transmission of a data frame after elapse of a second predetermined period from reception of the confirmation frame, and the data receiving end replies an acknowledgement frame (ACK) after elapse of a third predetermined period from reception of the data frame; and
when operating as the data transmitting end, the communication apparatus waits for a reception of the confirmation frame by using a receive beam pattern directed in a direction of a position of the data receiving end, after elapse of the first predetermined period from transmission of the transmission start request frame, or the communication apparatus waits for the reception of the confirmation frame by using the receive beam pattern directed in the direction of the position of the data receiving end, after elapse of the third predetermined period from transmission of the data frame.

8. The communication apparatus according to claim 1, wherein
   a procedure is applied in which a data transmitting end transmits a transmission start request frame, a data receiving end replies a confirmation frame after elapse of a first predetermined period from reception of the transmission start request frame, the data transmitting end starts transmission of a data frame after elapse of a second predetermined period from reception of the confirmation frame, and the data receiving end replies an acknowledgement frame (ACK) after elapse of a third predetermined period from reception of the data frame; and
   when operating as the data receiving end, the communication apparatus waits for a reception of the data frame by using a receive beam pattern directed in a direction of a position of the data receiving end, after elapse of the second predetermined period from transmission of the confirmation frame.

9. A communication method, comprising:
   in a communication apparatus that comprises a radio communication section configured to perform directional radio communication in accordance with a communication mode using a predetermined high frequency band:
   performing the directional radio communication of a predetermined preparation frame by controlling a directivity of the radio communication section, when starting data transmission after exchanging the predetermined preparation frame with a communicating party,
   wherein the communication apparatus performs the directional radio communication of the predetermined preparation frame by using a communication beam pattern used for performing a prior frame exchange with the communicating party, and
   wherein the communication apparatus adjusts the communication beam pattern in accordance with an elapsed time from the prior frame exchange with the communicating party.

10. A non-transitory computer readable storage medium having stored thereon, a computer program having at least one code section executable by a computer for causing the computer to perform steps comprising:
    performing directional radio communication of a predetermined preparation frame by controlling a directivity of a radio communication section, when starting data transmission after exchanging the predetermined preparation frame with a communicating party,
    wherein the communication apparatus performs the directional radio communication of the predetermined preparation frame by using a communication beam pattern used for performing a prior frame exchange with the communicating party,
    wherein the communication apparatus adjusts the communication beam pattern in accordance with an elapsed time from the prior frame exchange with the communicating party.

11. The communication apparatus according to claim 1, further comprising a position detecting section configured to detect position information of the communication apparatus with respect to the communicating party.

12. The communication apparatus according to claim 11, wherein the communication apparatus adjusts the communication beam pattern in accordance with the position information.

* * * * *